(12) United States Patent
Lai

(10) Patent No.: US 8,276,922 B2
(45) Date of Patent: Oct. 2, 2012

(54) CHILD TRAILER

(76) Inventor: Chin-I Lai, Tainan (TW)

( * ) Notice: Subject to any disclaimer, the term of this patent is extended or adjusted under 35 U.S.C. 154(b) by 0 days.

(21) Appl. No.: 13/036,704

(22) Filed: Feb. 28, 2011

(65) Prior Publication Data
US 2012/0217720 A1  Aug. 30, 2012

(51) Int. Cl.
*B62D 63/00* (2006.01)
(52) U.S. Cl. .................. 280/32.7; 280/656
(58) Field of Classification Search .......... 280/32.7, 280/204, 292, 656, 288.4
See application file for complete search history.

(56) References Cited

U.S. PATENT DOCUMENTS

| | | | | |
|---|---|---|---|---|
| 6,827,356 B2 * | 12/2004 | Zhuang | ............ | 280/32.7 |
| 7,581,737 B2 * | 9/2009 | Cousin | ............ | 280/63 |
| 7,971,884 B2 * | 7/2011 | Lundh | ............ | 280/32.7 |
| 8,029,007 B2 * | 10/2011 | Jones et al. | ............ | 280/47.131 |
| 2007/0090619 A1 * | 4/2007 | Lundh | ............ | 280/63 |
| 2007/0114738 A1 * | 5/2007 | Jones et al. | ............ | 280/32.7 |

* cited by examiner

*Primary Examiner* — Tony Winner
(74) *Attorney, Agent, or Firm* — Muncy, Geissler, Olds & Lowe, PLLC

(57) ABSTRACT

A child trailer includes a body with a plurality of wheels located at the bottom thereof, a joint and a coupler. The joint is located in front of the body to adjust the angle with the body. The coupler includes a coupling dock, a pair of adjustment arms and a pair of strap holders. The coupling dock is connected to the front end of the joint. The adjustment arms are respectively connected to the left side and right side of the coupling dock. Each of the adjustment arms includes a sleeve to adjust the transverse distance and an adjustment bar to adjust the longitudinal distance. The adjustment arm also has a pivotal member hinged on the strap holder. The strap holders are fastened to a stroller to enhance steadiness and safety and improve practicality.

9 Claims, 13 Drawing Sheets

CHILD TRAILER

FIELD OF THE INVENTION

The present invention relates to a child trailer to be hitched on a stroller to carry goods or support a child standing.

BACKGROUND OF THE INVENTION

These days during family outing with a baby or little kid, a stroller generally is provided for the parents to take care of the baby. A detachable child trailer that can be hitched on the rear side of the stroller may also be carried so that a baby can be seated in the stroller while a kid can stand on the trailer to allow the parents to take care of them at the same time. When not in use, the trailer can function as a carrier to hold paraphernalia or luggage to alleviate hassles of outing.

The Applicant has proposed a "Child trailer" in U.S. application Ser. No. 12/778,672. Referring to FIG. 1, the child trailer 1 includes a body 11, a plurality of wheels 111 at the bottom of the body 11, and a joint 12 at the front side of the body 11 to adjust the angle with the body 11. The front side of the joint 12 has a coupler 13 which includes a holder 131, and a first adjustment arm 132 and a second adjustment arm 133 that are symmetrical. The first and second adjustment arms 132 and 133 have respectively a clamp device 134 which has a clamp 1341 to couple the child trailer 1 on the skeleton such as the wheel stem, frame or handles of a stroller.

While the aforesaid child trailer can be hitched on any type of strollers to support a child standing or carry goods, and provide great practicality. However, the clamp device 134 is coupled to the stroller skeleton by latching through the clamp 1341, the distance between the child trailer and the stroller cannot be adjusted appropriately. Moreover, the clamp device 134 and the stroller skeleton are not tightly coupled, so that impact easily takes places to generate noises. There is still room for improvement.

SUMMARY OF THE INVENTION

Therefore, the object of the present invention is to solve the problem of the aforesaid child trailer that has poor compactness and results in deficient applicability by providing a child trailer with a coupler including adjustment arms and a strap holder. Hence the child trailer of the invention is adaptable to the skeleton such as wheel stem, frame or handles of all types of strollers or handcarts to provide better compactness and stability.

To achieve the foregoing object, the child trailer according to the invention includes a body, a joint and a coupler. The body has a plurality of wheels at the bottom thereof. The joint is located at the front side of the body and can be adjusted to a desired angle to be then fastened to form a movable joint. The invention further provides features as follows: the coupler includes a coupling dock, a pair of adjustment arms, and a pair of strap holders. The coupling dock is connected to the front end of the joint, and includes a slide beam at each of two sides of a front end thereof. Each adjustment arm includes a sleeve coupled to the slide beam, an adjustment bar and a pivotal member. The sleeve includes an anchor portion extended from one end perpendicular to the axis thereof. The anchor portion includes a passage and a plurality of holes spaced from one another at the bottom edge. The adjustment bar includes a tube and a latch member held in the tube. The latch member includes a lump stuck in one of the holes to form fixed insertion when the tube is held in the anchor portion. The pivotal member is coupled to the front end of the tube and has a round stem extended from one side to hold an axle. The invention further includes a pair of strap holders. Each strap holder includes a holder and a fastening member. The holder includes one side coupled to a strap with tooth traces formed on one surface thereof, and another side having an opening run through by the strap and an engagement device. The engagement device includes an engaging portion corresponding to the tooth traces of the strap. The fastening member is connected to the holder and includes a latch trough coupled with the axle of the pivotal member. The holder further includes an anti-slipping member wedged on the front end to provide firmer connection when the child trailer is hitched on a stroller.

In summary, the invention provides many advantages, notably:

1. After the joint and the coupler are coupled, the sleeve can be moved transversely to adjust the width and the adjustment bar can be changed longitudinally to adjust the front and rear distance according to different types of strollers, and the pivotal member can be adjusted to a desired angle to hitch on the stroller skeleton so that the body can be extended from the stroller to form a platform to support a child standing or carry goods, thereby can alleviate the burden of parents when taking children outdoors and provide improved usability and practicality.

2. When the invention is in use, it is fastened to the stroller skeleton through the strap holder to form a tight coupling, thus can eliminate the shortcomings of the conventional techniques and reduce noises, provides better stability, and also enhances use safety.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
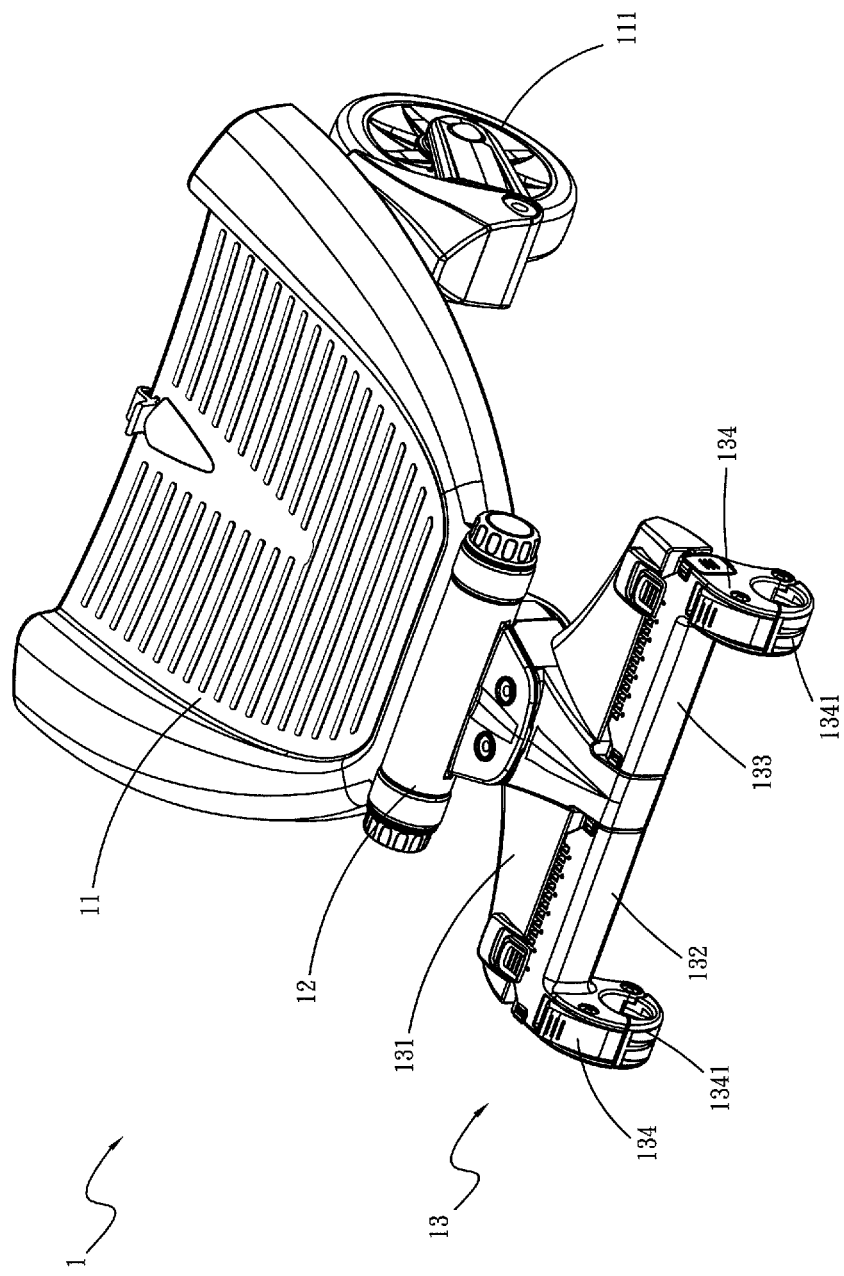
FIG. 1 is a perspective view of the child trailer proposed by the Applicant in U.S. application Ser. No. 12/778,672.
Figure 2:
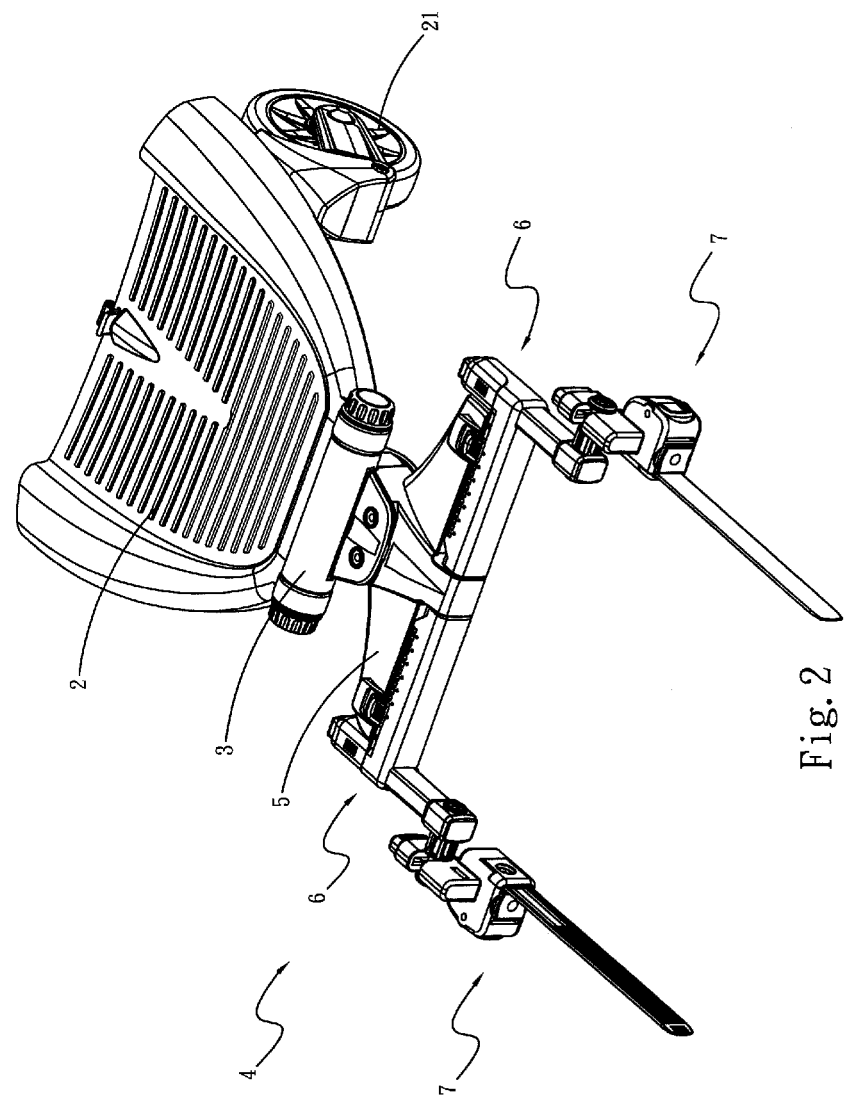
FIG. 2 is a perspective view of a first embodiment of the invention.
Figure 3:
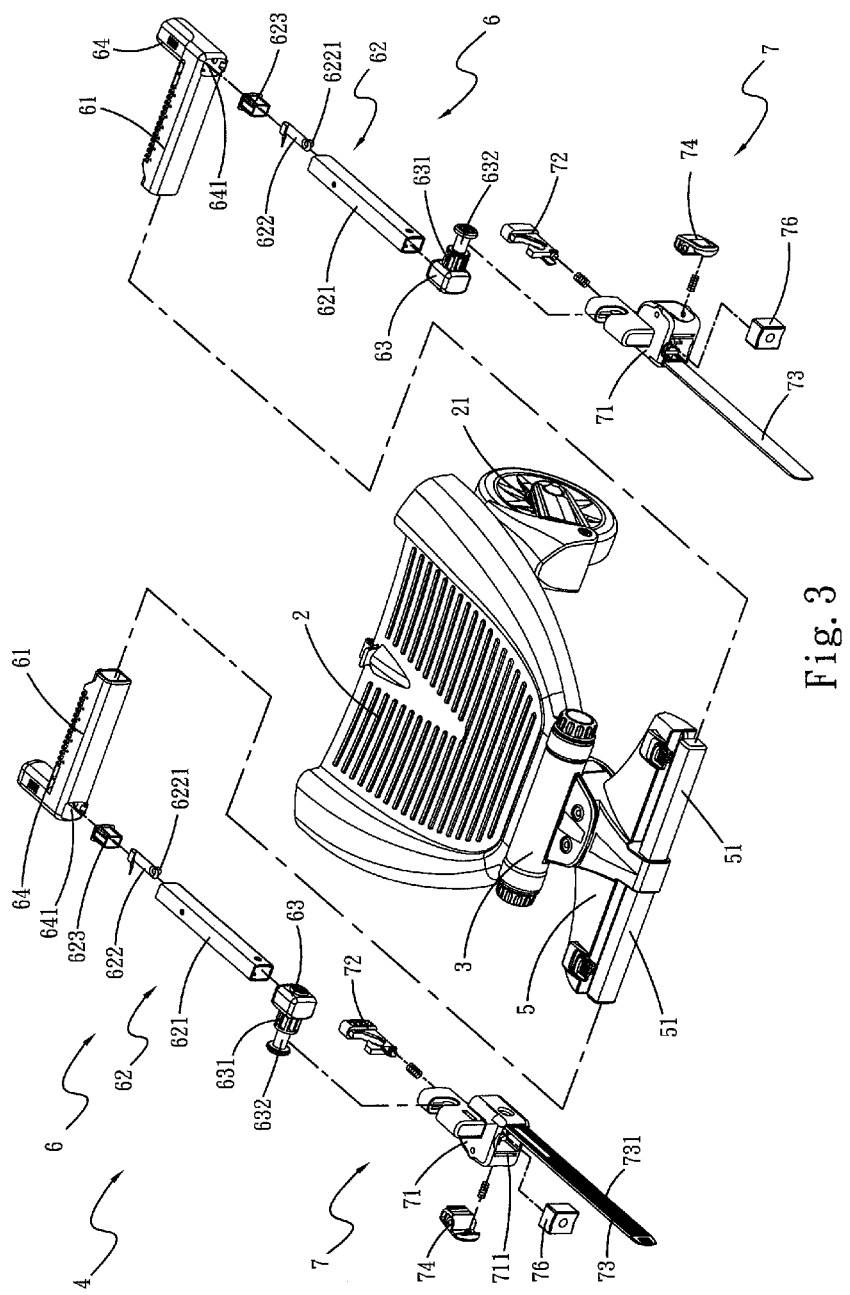
FIG. 3 is an exploded view of the first embodiment of the invention.
Figure 4:
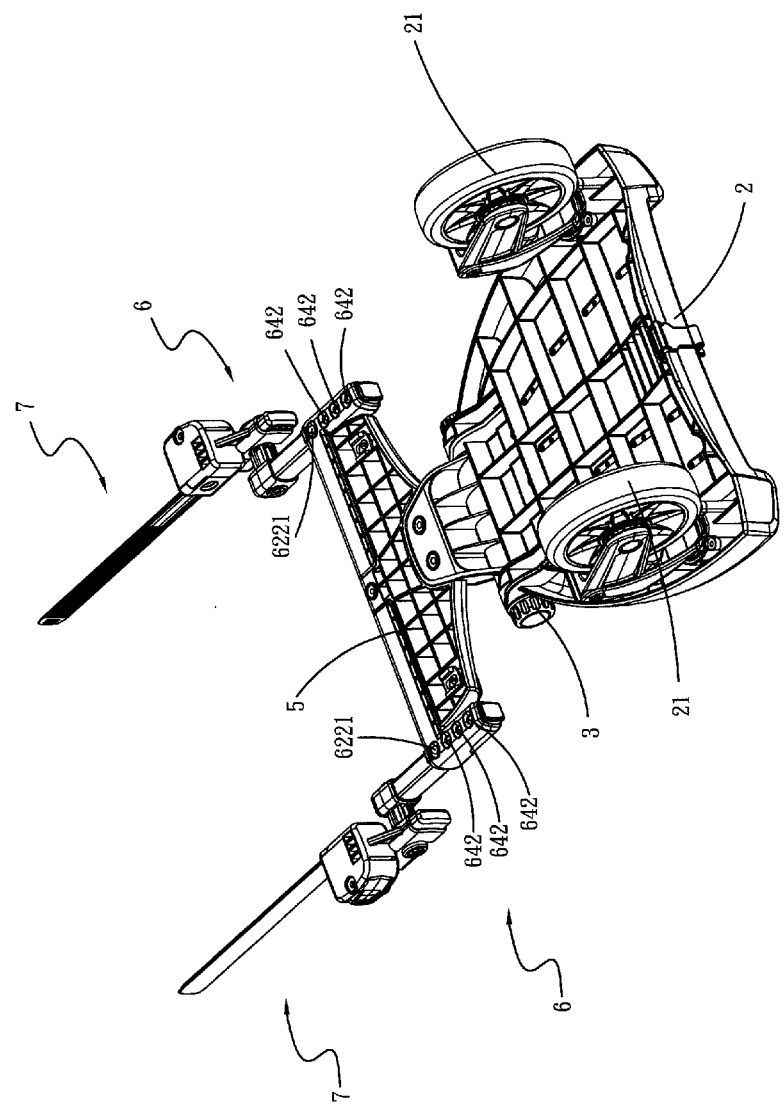
FIG. 4 is a bottom view of the first embodiment of the invention.
Figure 5:
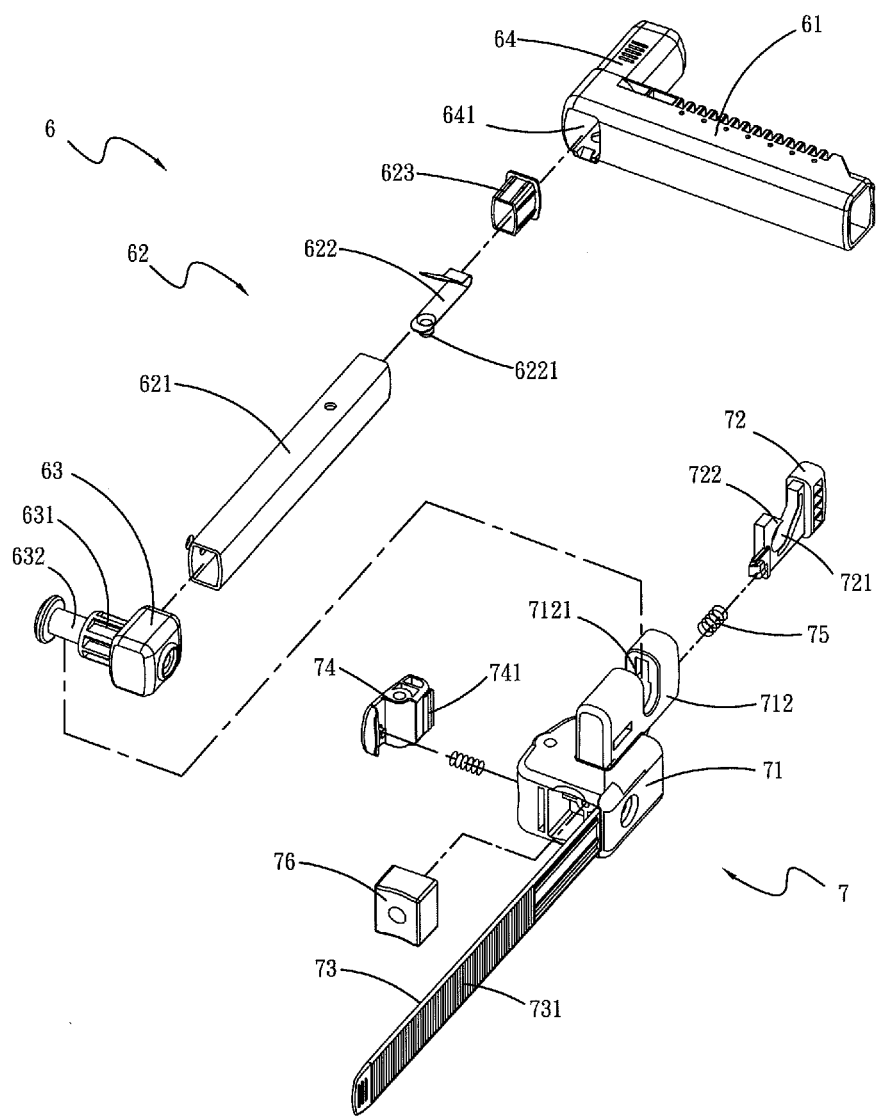
FIG. 5 is an exploded view of the first embodiment showing an adjustment arm and a strap holder.
Figure 6A:
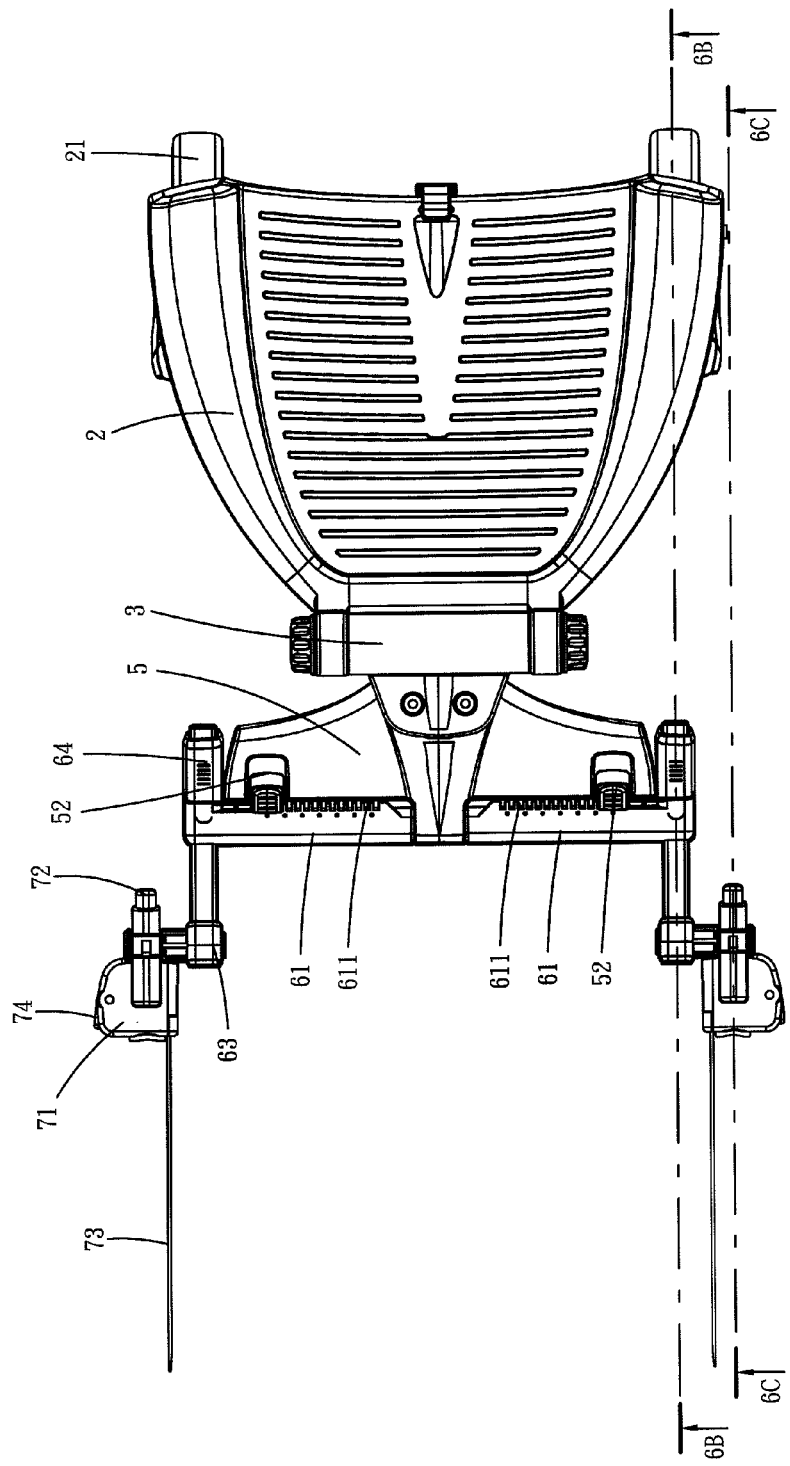
FIG. 6A is a top view of the first embodiment of the invention.
Figure 6B:
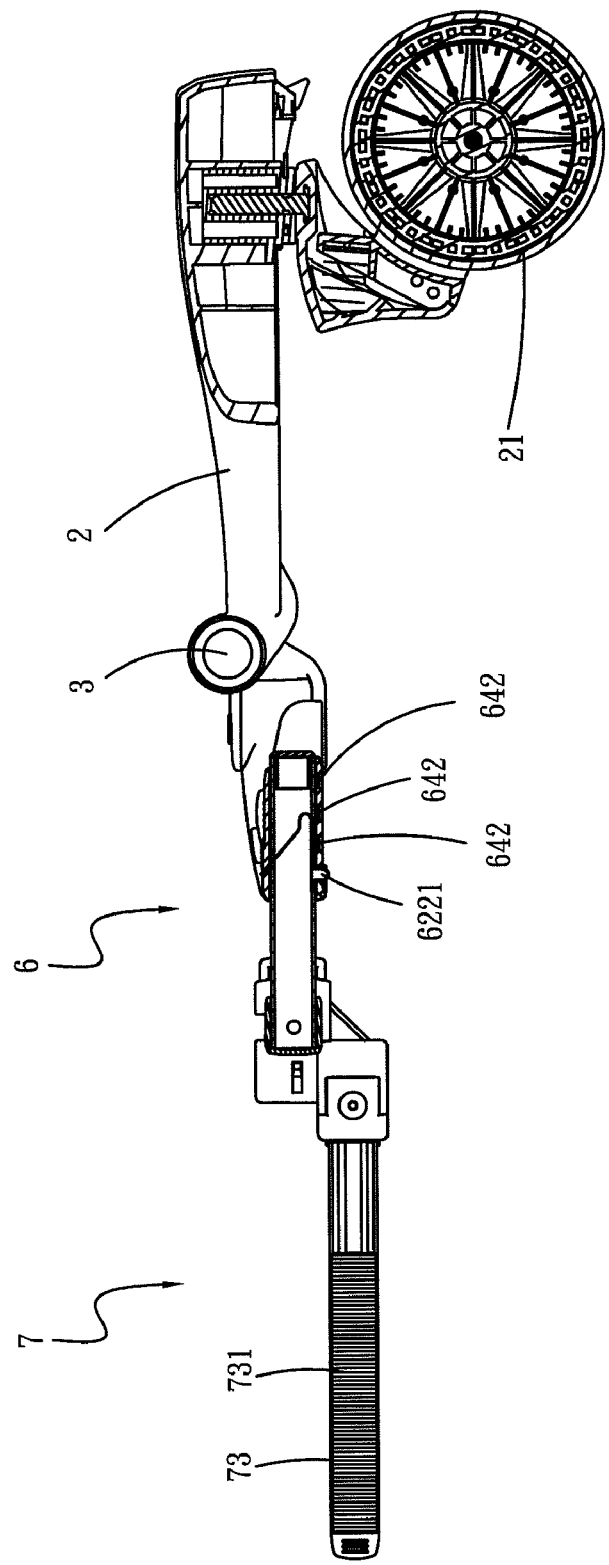
FIG. 6B is a sectional view taken on line 6B-6B in FIG. 6A.
Figure 6C:
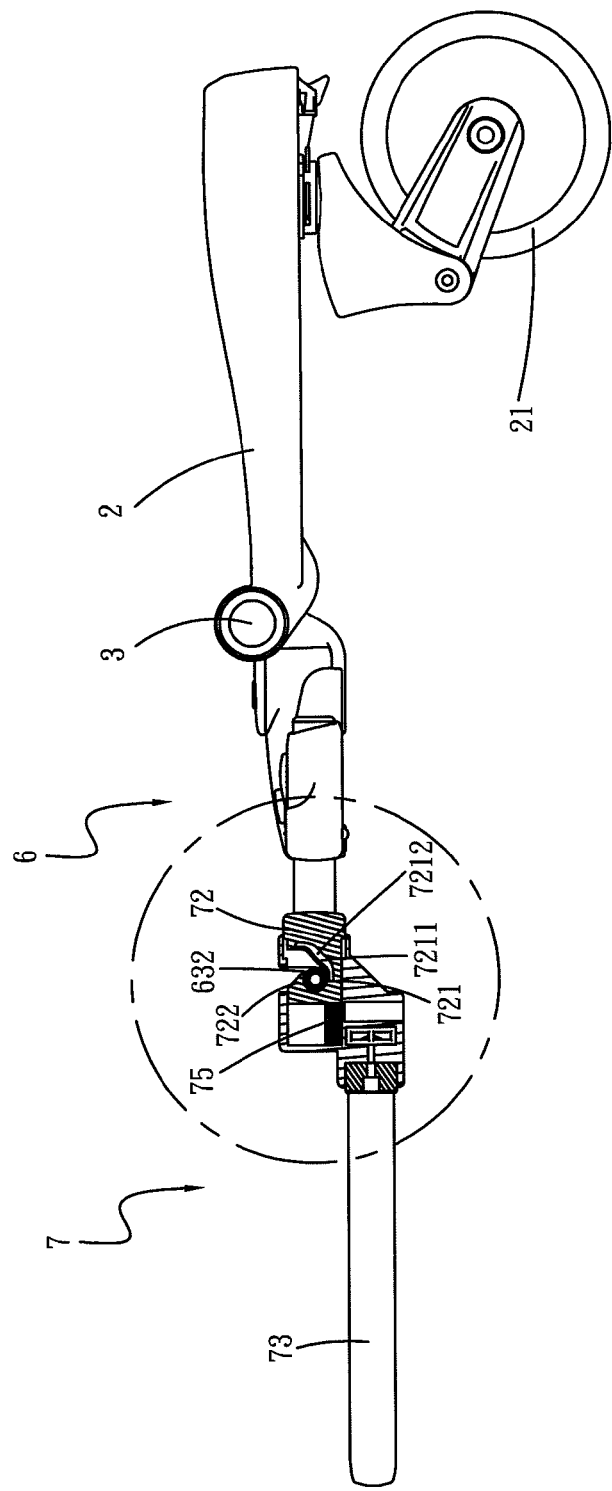
FIG. 6C is a sectional view taken on line 6C-6C in FIG. 6A.

Please refer to FIGS. 2 through 5 for a first embodiment of the child trailer of the invention. It comprises a body 2, a joint 3, and a coupler 4.

The body 2 includes a plurality of wheels 21 at the bottom thereof.

The joint 3 is located in front of the body 2 and can be adjusted to a desired angle to be then fastened to form a movable joint.

The coupler 4 includes a coupling dock 5, a pair of adjustment arms 6 and a pair of strap holders 7. The coupling dock 5 is connected to the front end of the joint 3, and includes a slide beam 51 at each of two sides of a front end thereof. Each adjustment arm 6 includes a sleeve 61 coupled to the slide beam 51, an adjustment bar 62 and a pivotal member 63. The sleeve 61 includes an anchor portion 64 extended from one end perpendicular to the axis thereof. The anchor portion 64 includes a passage 641 and a plurality of holes 642 spaced from one another at the bottom edge (referring to FIG. 4). The adjustment bar 62 includes a tube 621 and a latch member 622. The tube 621 is hollow and includes an aperture (not shown in the drawings) close to the center thereof. The latch member 622 is an elastic plate held in the tube 621. The tube 621 has one end sealed by a cap 623. The latch member 622 includes a lump 6221 corresponding to the aperture so that when the tube 621 is inserted into the passage 641, the lump 6221 is stuck in one of the holes 642 to form fixed insertion. The pivotal member 63 includes an orifice (not shown in the drawings) coupled with the front end of the tube 621 of the adjustment bar 62, and a round stem 631 extended from one side to hold an axle 632. Each strap holder 7 includes a holder 71 and a fastening member 72. The holder 71 includes one side coupled to a strap 73 with tooth traces 731 formed on one surface thereof, and another side having an opening 711 run through by the strap 73 and an engagement device 74. The engagement device 74 includes an engaging portion 741 corresponding to the tooth traces 731 of the strap 73. The holder 71 further includes a coupling portion 712 on an upper side with a notch 7121 formed in the center, and a holding portion (not shown in the drawings) on a rear end corresponding to the fastening member 72. The fastening member 72 includes a latch trough 721 to hold an elastic reed 7211 and a buffer aperture 7212 (also referring to FIGS. 7 and 8). The latch trough 721 includes a hook 722 at an upper end to allow the axle 632 of the pivotal member 63 hinged and confined in the latch trough 721. The fastening member 72 is inserted into the holding portion of the coupling portion 712 for fastening through an elastic element 75 such as a spring. The holder 71 further includes a front end wedged by an anti-slipping member 76 which can be a lid made of rubber.

When the invention is in use, referring to FIGS. 6A through 8, the sleeve 61 of the adjustment arm 6 is coupled to the slide beam 51 which is located at the front end of the coupling dock 5; the sleeve 61 includes tooth grooves 611 formed thereon so that it can be moved left and right to adjust the interval at a desired width, then is anchored through a safety buckle 52 of the coupling dock 5; next, insert the adjustment bar 62 into the passage 641 of the anchor portion 64, and adjust the position of the adjustment bar 62 in the passage 641 by moving forwards and backwards through pressing the lump 6221 of the latch member 622 to be stuck in one of the holes 642 to form fixed insertion; couple a cap 623 to the rear end of the adjustment bar 62 and couple the pivotal member 63 to the front end thereof to form an integrated body; next, press the fastening member 72 into the holding portion at the rear end of the holder 71 to couple with the integrated body mentioned above to form an integrated assembly. Press the axle 632 of the pivotal member 63 downwards to be latched between the notch 7121 of the coupling portion 712 and the latch trough 721 of the fastening member 72, hence when the fastening member 72 is released, the hook 722 securely confines the axle 632, and the pivotal member 63 can be swiveled about the latch trough 721 to adjust the angle as desired. Finally, the strap 73 can be threaded through the stroller skeleton at a corresponding location and returned to pass through the opening 711 of the same strap holder 7 with the tooth traces 731 latched by the engaging portion 741 of the engagement device 74 to form a secure fastening. Thereby the child trailer of the invention can be firmly hitched on the rear side of the stroller. The strap 73 and the anti-slipping member 76 allow the invention to form a tight coupling with the stroller to enhance steadiness and improve safety of the child when carrying.

Figure 7:
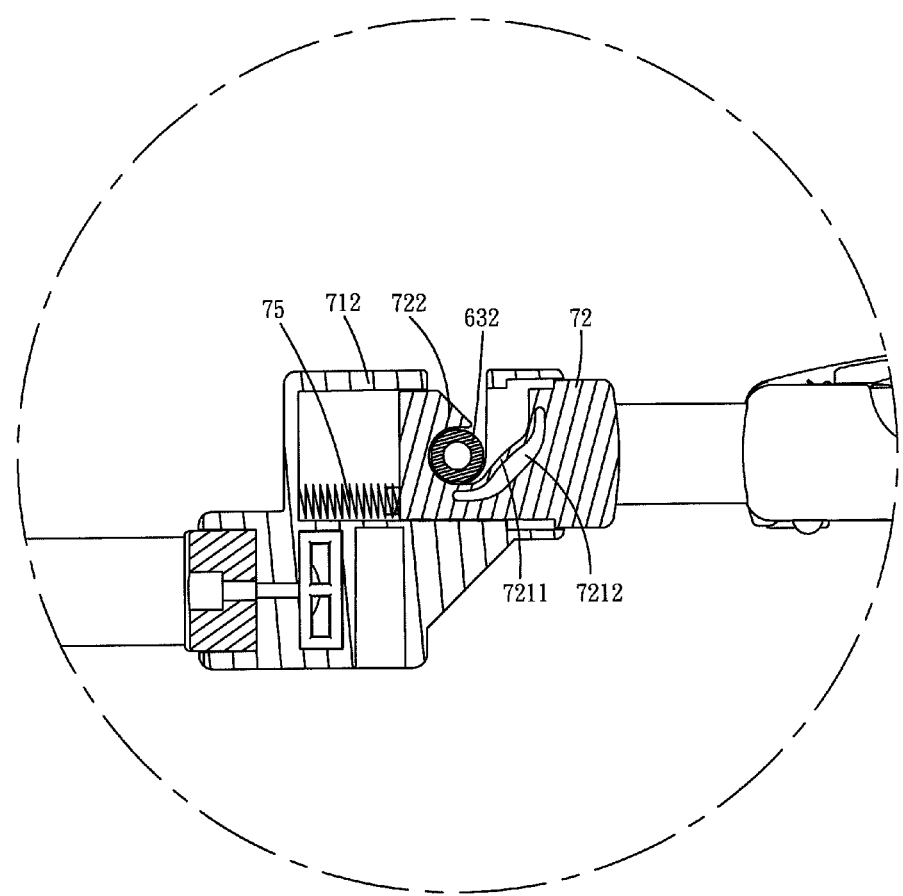
FIG. 7 is a sectional view of the first embodiment of the invention showing the pivotal member and fastening member in a coupled condition.
Figure 8:
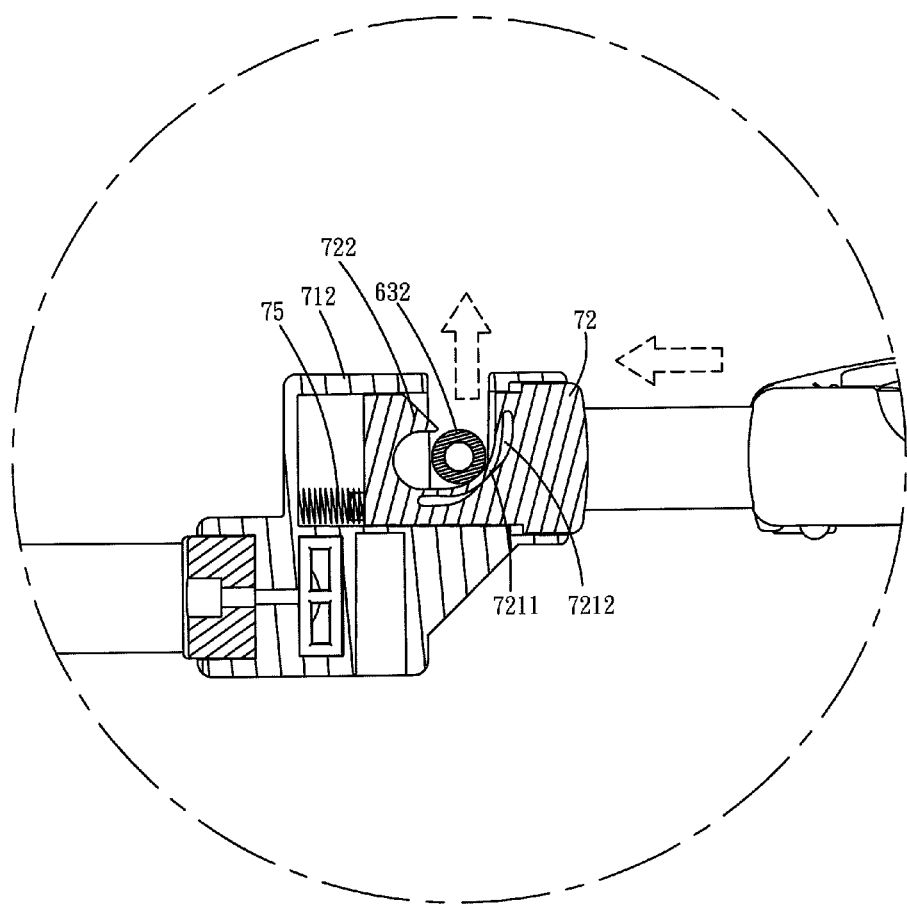
FIG. 8 is a schematic view of the first embodiment of the invention showing the pivotal member and fastening member in an unfastening condition.

Referring to FIGS. 7 and 8, when to unfasten the adjustment arm 6 and strap holder 7 is desired, press the fastening member 72 and move it inwards in the holding portion of the coupling portion 712, the axle 632 held in the notch 7121 pushes the elastic reed 7211 of the fastening member 72 to be deformed in the buffer aperture 7212; when the hook 722 is pushed into the holding portion, confinement of the axle 632 is disappeared, then the elastic reed 7211 bounces back to its original position to push the axle 632 upwards to escape from the confining range of the notch 7121 and latch trough 721. Such a design makes fastening and unfastening easier.

Figure 9:
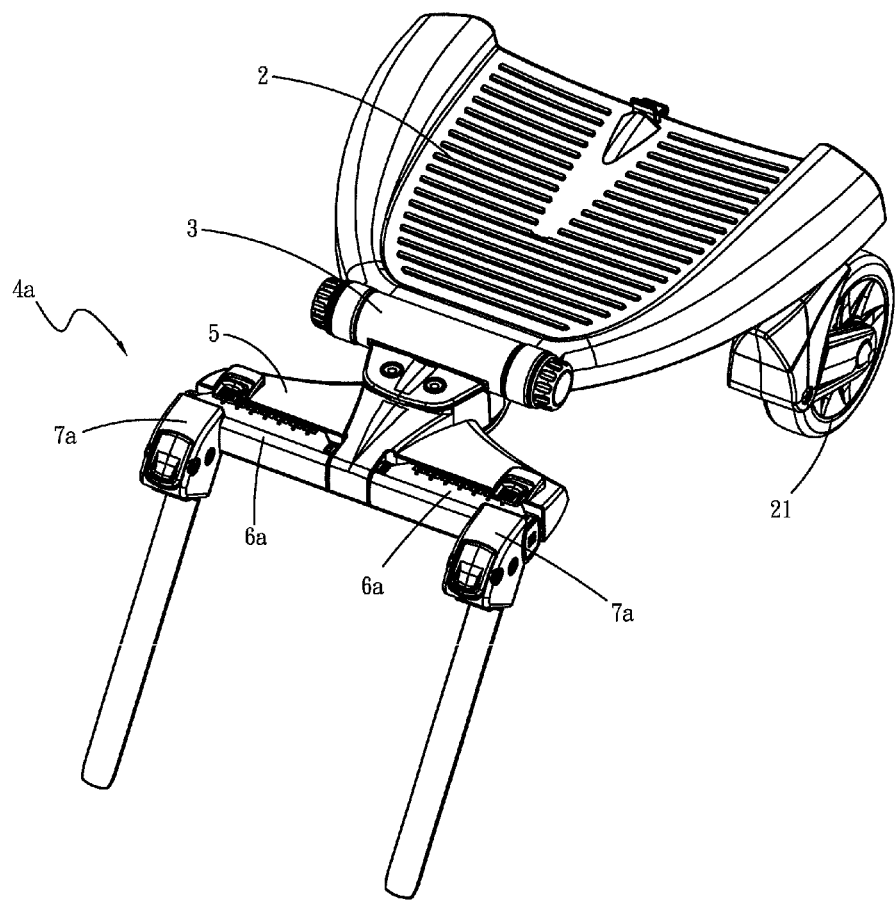
FIG. 9 is a perspective view of a second embodiment of the invention.
Figure 10:
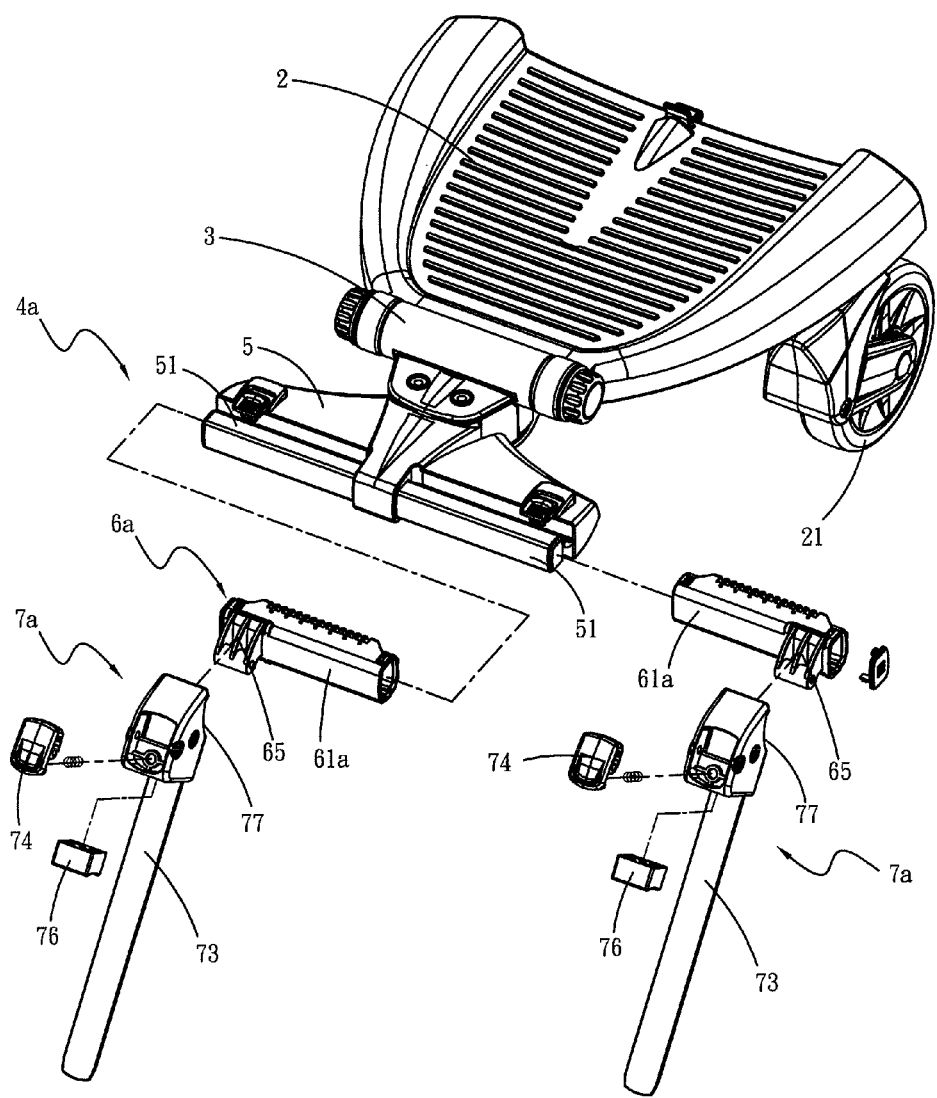
FIG. 10 is an exploded view of the second embodiment of the invention.
Figure 11:
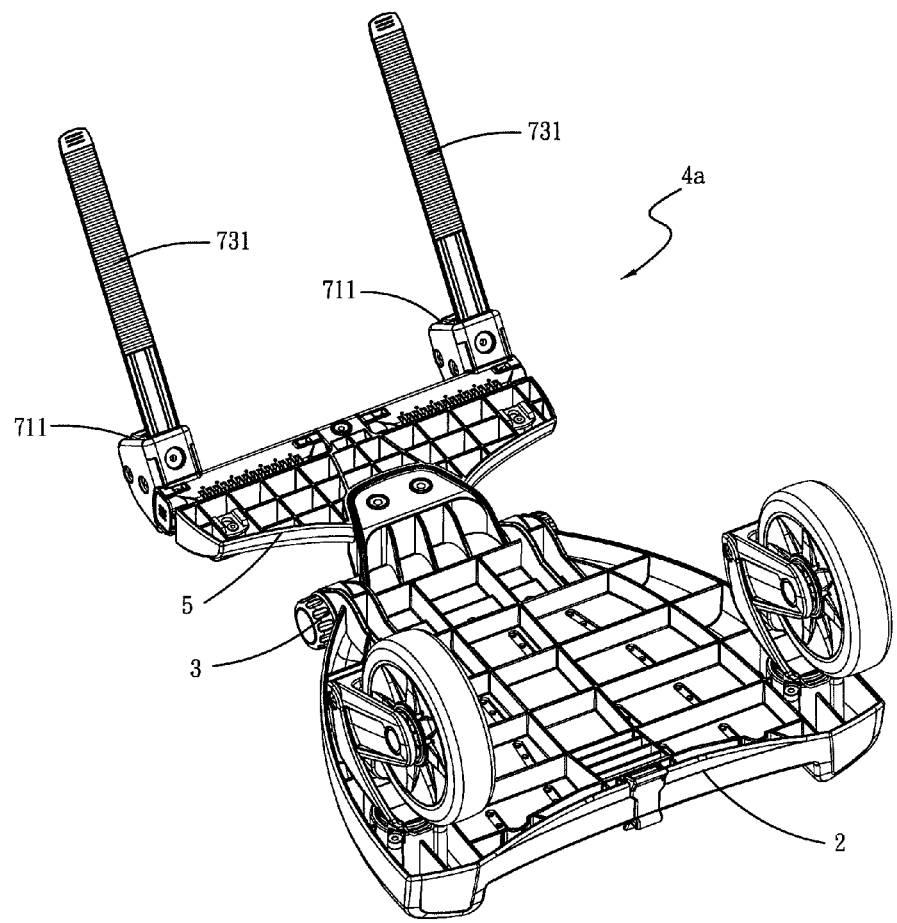
FIG. 11 is a bottom view of the second embodiment of the invention.

Please refer to FIGS. 9 through 11 for a second embodiment of the invention. It is a variation of the first embodiment previously discussed. It also includes a body 2, a joint 3 and a coupler 4a. The body 2 includes a plurality of wheels 21 at the bottom thereof. The joint 3 is located at the front side of the body 2 and can be adjusted to a desired angle to be then fastened to form a movable joint. It differs from the previous embodiment in the coupler 4a which includes a coupling dock 5, a pair of adjustment arms 6a and a pair of strap holders 7a. The coupling dock 5 is connected to the front end of the joint 3 and includes a slide beam 51 at each of two sides of a front end thereof. Each adjustment arm 6a includes a sleeve 61a coupled to the slide beam 51 of the coupling dock 5. The sleeve 61a includes a first sliding track 65 extended from one end thereof. Each strap holder 7a includes a second sliding track 77 at the upper end corresponding to the first sliding track 65, a strap 73 extended from one side with tooth traces 731 formed on one surface thereof, and an opening 711 run through by the strap 73 and an engagement device 74 at another side. The engagement device 74 includes an engaging portion (not shown in the drawings) corresponding to the tooth traces 731 of the strap 73. The strap holder 7a further includes a front end wedged by an anti-slipping member 76.

When the second embodiment is in use, the second sliding track 77 can be latched on the first sliding track 65; then the child trailer of the invention can be fastened to a transverse frame at the rear end of a stroller through the strap 73.

What is claimed is:

1. A child trailer, comprising a body, a joint and a coupler, the body including a plurality of wheels at a bottom thereof, the joint being located in front of the body, wherein:

the coupler includes a coupling dock, a pair of adjustment arms and a pair of strap holders; the coupling dock being connected to a front end of the joint and including two slide beams at two sides of a front end of the coupling dock; each adjustment arm including a sleeve coupled to one of the two slide beams, an adjustment bar and a pivotal member, the sleeve including an anchor portion extended from one end, the anchor portion including a passage, the adjustment bar including a tube and a latch member held in the tube, the tube running through the passage; the pivotal member being coupled to a front end of the tube and including a round stem and an axle that are extended from one side of the pivotal member; each strap holder including a holder and a fastening member, the holder including one side coupled to a strap with tooth traces and another side comprises an engagement device which includes an engaging portion corresponding to the tooth traces of the strap, the fastening member being located on the holder and including a latch trough to hold an elastic reed and a buffer aperture, the axle of the pivotal member being hinged to the latch trough.

2. The child trailer of claim 1, wherein the holder includes an opening.

3. The child trailer of claim 1, wherein the anchor portion includes a plurality of holes spaced from one another at a bottom edge.

4. The child trailer of claim 1, wherein the latch member is an elastic plate with a lump.

5. The child trailer of claim 1, wherein the holder includes an anti-slipping member at a front end thereof.

6. The child trailer of claim 1, wherein the latch trough is coupled with a hook.

7. A child trailer, comprising a body, a joint and a coupler, the body including a plurality of wheels at a bottom thereof, the joint being located in front of the body, wherein:
  the coupler including a coupling dock, a pair of adjustment arms and a pair of strap holders; the coupling dock being connected to a front end of the joint and including two slide beams at two sides of a front end of the coupling dock; each adjustment arm including a sleeve coupled to one of the two slide beams, the sleeve including a first sliding track extended from one end thereof; each strap holder including a second sliding track at an upper side corresponding to the first sliding track, and one side coupled to a strap with tooth traces formed on one surface thereof, and another side comprises an engagement device which includes an engaging portion corresponding to the tooth traces of the strap.

8. The child trailer of claim 7, wherein the strap holder includes an opening.

9. The child trailer of claim 7, wherein the strap holder includes an anti-slipping member at a front end thereof.

* * * * *